(12) United States Patent
Kunugi

(10) Patent No.: US 7,062,197 B2
(45) Date of Patent: Jun. 13, 2006

(54) IMAGE FORMING APPARATUS WITH ROTATABLE CONTROL PANEL UNIT

(75) Inventor: Hiroyuki Kunugi, Numazu (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 91 days.

(21) Appl. No.: 10/774,435

(22) Filed: Feb. 10, 2004

(65) Prior Publication Data

US 2005/0175371 A1    Aug. 11, 2005

(51) Int. Cl.
*G03G 15/00* (2006.01)

(52) U.S. Cl. .......................... 399/107; 399/81

(58) Field of Classification Search ................ 399/105, 399/125, 381, 397, 405, 107, 108, 109, 110, 399/124, 411, 81
See application file for complete search history.

(56) References Cited

U.S. PATENT DOCUMENTS 6,690,901 B1 *  2/2004  Katsuyama et al. ........ 399/107
6,725,011 B1 *  4/2004  Sato ........................... 399/405
6,771,917 B1 *  8/2004  Kaiho .......................... 399/92
6,795,662 B1 *  9/2004  Kudo ........................... 399/81
6,934,502 B1 *  8/2005  Okuda ........................ 399/379

FOREIGN PATENT DOCUMENTS

JP    2000-348474 A    12/2000
JP    2004-246376    *  9/2004

* cited by examiner

*Primary Examiner*—Hoan Tran
(74) *Attorney, Agent, or Firm*—Foley & Lardner LLP

(57) ABSTRACT

An image forming apparatus include an ejection space defined between the bottom of an image reading section and image forming section and having an opening at the front of the main unit, an ejection tray cover defining the bottom of the ejection space and configured to receive a paper sheet ejected from the image forming section, the ejection tray cover covering the image forming section, an attachment section provided at the front of the image reading section, and a control panel unit attached to the attachment section by a hinge having a predetermined rotational resistance, the control panel unit being rotatable through a predetermined angle with respect to an imaginary horizontal plane, and being able to be held in a direction of rotation.

10 Claims, 13 Drawing Sheets

IMAGE FORMING APPARATUS WITH ROTATABLE CONTROL PANEL UNIT

BACKGROUND OF THE INVENTION

The present invention relates to an image forming apparatus having an improved attachment structure for its control panel unit.

In image forming apparatuses, a photosensitive unit is provided in a main unit, and a toner image formed thereon is transferred onto a sheet of paper. The sheet of paper with the toner image transferred thereon is sent to a fixing unit, where it is heated and pressed to have the toner image fixed thereon. After fixing, the paper sheet is ejected into a paper ejection tray via an ejection roller.

In general, ejection trays are attached to side portions of the main unit such that they protrude outwardly. Accordingly, it is necessary to locate the main unit away from the wall by a distance corresponding to the protruding ejection tray, which means that a large installation space is required.

In light of this, an image forming apparatus has been recently developed which has a structure that enables the main unit to be located in contact with the wall. This structure incorporates an ejection space with an opening formed at the front of the main unit, and an ejection tray cover that receives paper sheets ejected from the image forming section and covers the upper portion of the image forming section.

Thus, the above image forming apparatus comprises the main unit having the image forming section for forming an image on a paper sheet; an image reading section provided above the main unit, separate from the image forming section, for reading the image; the ejection space provided between the bottom of the image reading section and the image forming section and having the opening formed at the front of the main unit; and the ejection tray cover that receives paper sheets ejected from the image forming section and covers the upper portion of the image forming section.

This image forming apparatus further comprises a control panel unit provided at the front of the image reading section for controlling the image forming operation.

Further, a conveyance unit for conveying, when necessary, ejected paper sheets to an optional device, such as a sorting/stacking device, can be attached to and detached from the ejection space.

However, in the prior art, since the control panel unit is fixedly attached such that it blocks the front of the ejection space, even if an operator tries to visually confirm the paper sheets ejected onto the ejection tray cover, they cannot do it because of the control panel unit.

Further, when an operator tries to take the paper sheets out of the ejection tray cover, the control panel unit makes it difficult.

Furthermore, when the conveyance unit is attached to or detached from the ejection space, this work requires time and effort because the control panel unit interferes with the work.

BRIEF SUMMARY OF THE INVENTION

The present invention has been developed under the above-described circumstances, and aims to provide an image forming apparatus in which it is easy to visually confirm paper sheets ejected on the ejection tray cover, easy to take them out of the ejection space, and easy to attach and detach the conveyance unit to and from the ejection space.

An image forming apparatus comprising: a main unit having an image forming section configured to form an image on a sheet of paper; an image reading section located just above the main unit, and configured to read a document image; an ejection space defined between a bottom of the image reading section and the image forming section, the ejection space having an opening at a front of the main unit; an ejection tray cover defining a bottom of the ejection space and configured to receive a paper sheet ejected from the image forming section, the ejection tray cover covering the image forming section; an attachment section provided at a front of the image reading section; and a control panel unit attached to the attachment section by a hinge having a predetermined rotational resistance, the control panel unit being rotatable through a predetermined angle with respect to an imaginary horizontal plane, the control panel unit being able to be held in a direction of rotation.

Additional objects and advantages of the invention will be set forth in the description which follows, and in part will be obvious from the description, or may be leaned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate an embodiment of the invention, and together with the general description given above and the detailed description of the embodiment given below, serve to explain the principles of the invention.

DETAILED DESCRIPTION OF THE INVENTION

Embodiments of the invention will be described in detail with reference to the accompanying drawings.

Figure 1:
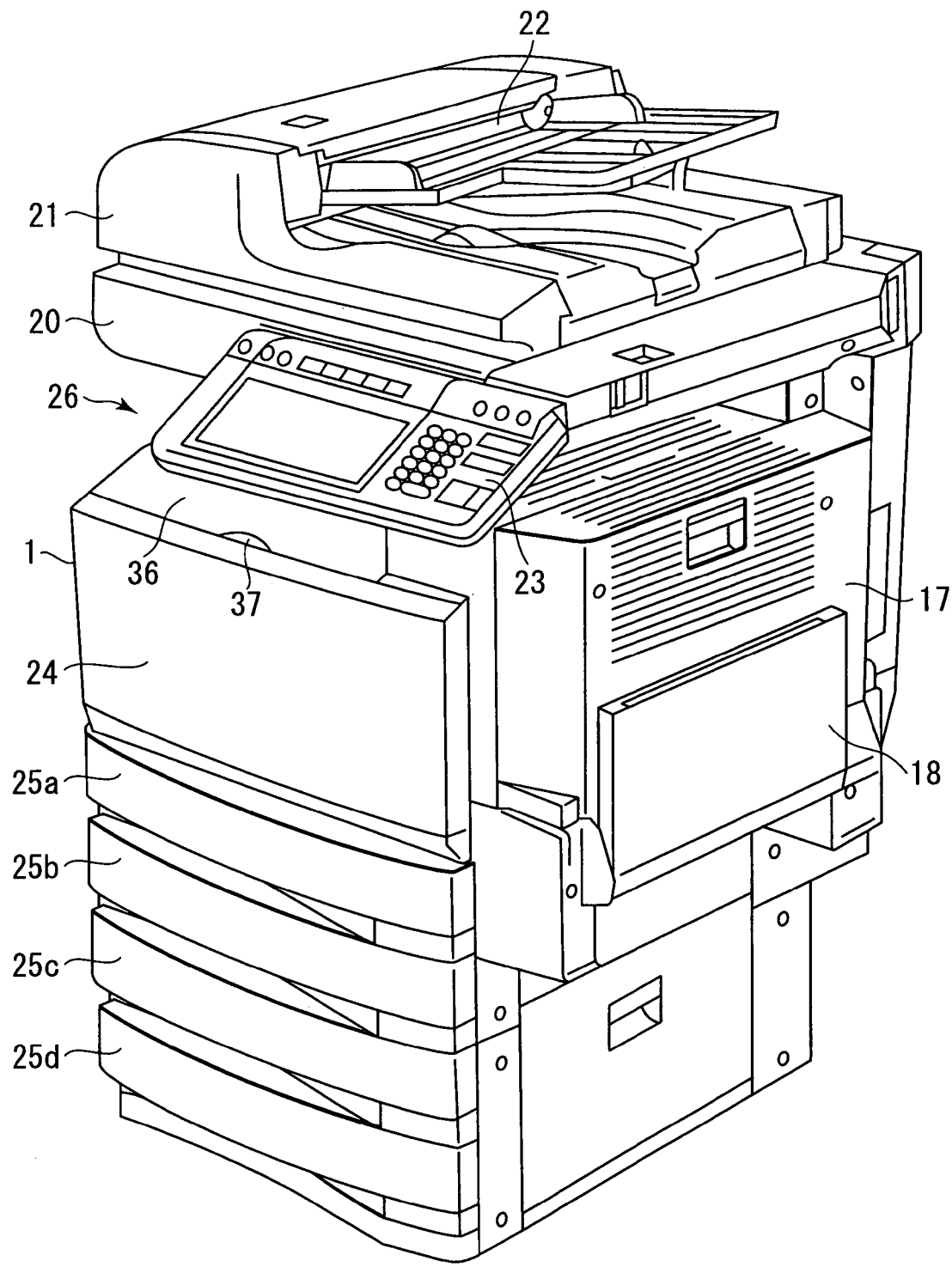
FIG. 1 is a perspective view illustrating the outward appearance of an image forming apparatus according to a first embodiment of the invention.

FIG. 1 is a perspective view illustrating the outward appearance of an image forming apparatus according to a first embodiment of the invention.

The image forming apparatus has a main unit 1, and an optical reading unit 20 as an image reading section for optically reading a document is provided above the main unit 1. An automatic feeding unit 21 for automatically feeding a document to the image reading section is provided on the upper portion of the reading unit 20. A control panel unit 23 for controlling the image forming operation of the image forming apparatus is provided on the front surface of the reading unit 20.

A front cover 24 for opening the main unit 1 when necessary is provided so that it can be opened and closed. A plurality of paper feed cassettes 25a to 25d are provided at the lower portion of the main unit 1 so that they can be pulled out of and pushed into the main unit.

Figure 2:
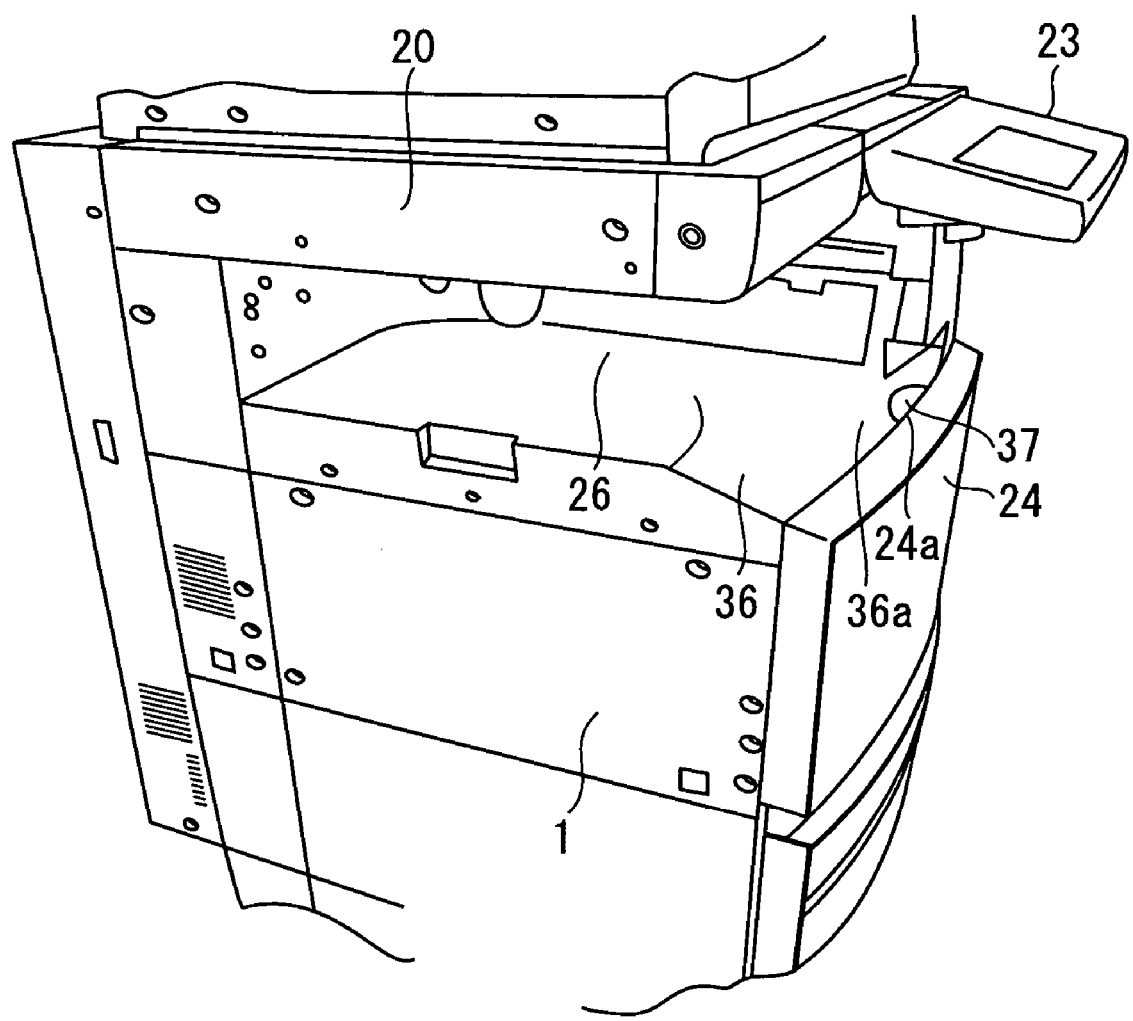
FIG. 2 is a perspective view illustrating the image forming apparatus as viewed at a different angle.

Further, an ejection space 26 and ejection tray cover 36 are provided between an image forming mechanism 1A (see FIG. 3) as the image forming section of the main unit 1, and the bottom of the reading unit 20. The ejection space has an opening formed at the front of the main unit 1 as also shown in FIG. 2. The ejection tray cover 36 receives a paper sheet ejected from the image forming mechanism 1A, as the image forming section, located below the ejection space 26, and covers the upper portion of the image forming mechanism 1A.

An operator can take paper sheets out of the ejection tray cover 36 through the front opening of the ejection space 26.

The ejection tray cover 36, which has a function for covering the upper portion of the image forming mechanism 1A and a function for receiving ejected paper sheets and stacking them, may be formed of a plurality of components or a single component. Further, an optional device (not shown) for, for example, sorting and stacking paper sheets with images formed thereon may be provided adjacent to one-side surface of the main unit 1.

Figure 3:
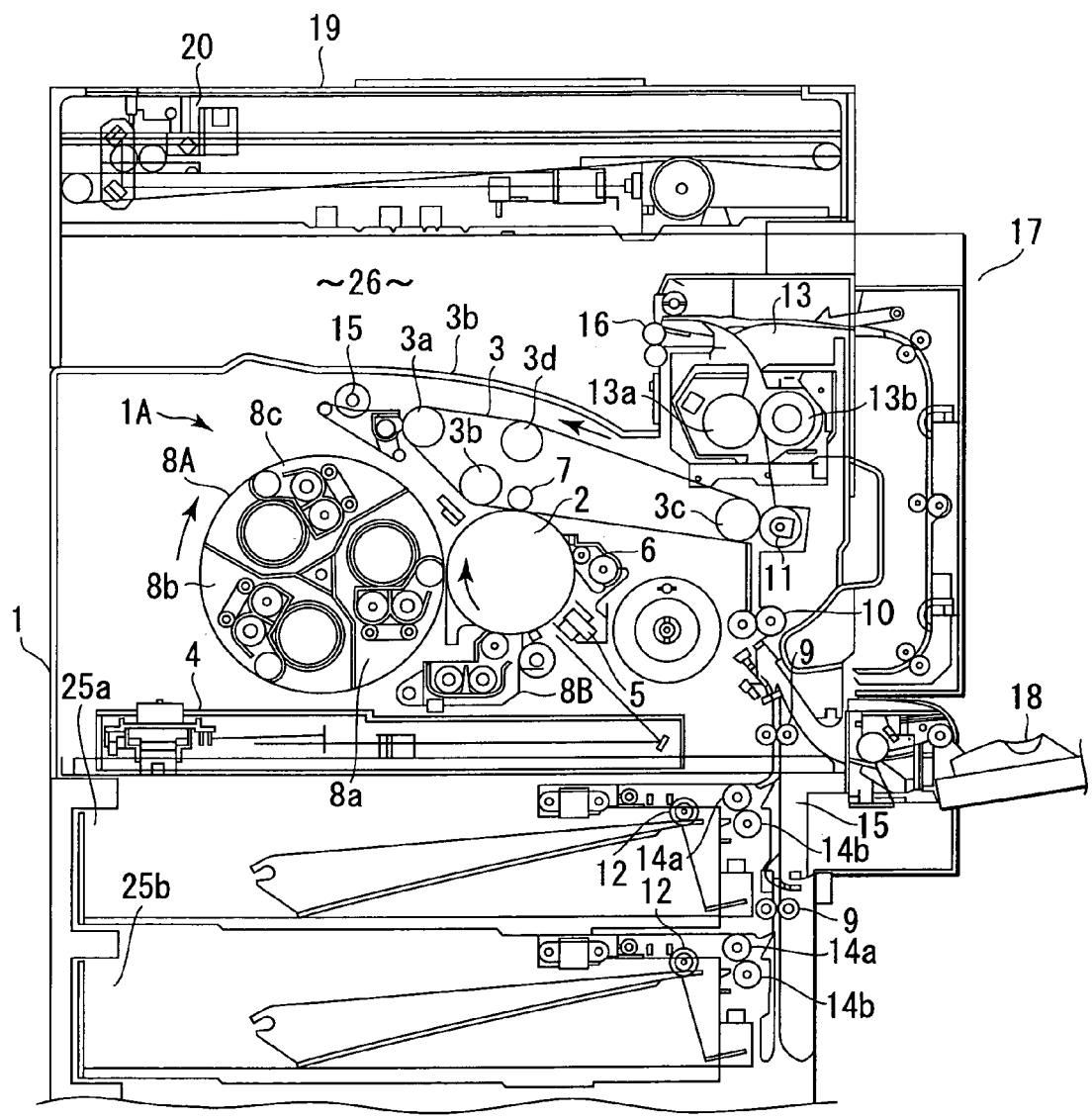
FIG. 3 is a view illustrating the internal structure of the image forming apparatus.

FIG. 3 illustrates the internal structure of the main unit 1.

The main unit 1 contains the image forming mechanism 1A as an image forming section. The image forming mechanism 1A comprises a photosensitive drum 2, a charger unit 5 for keeping the photosensitive drum 2 at a predetermined potential, and an exposure unit 4 for forming an electrostatic latent image on the charged photosensitive drum 2.

The image forming mechanism 1A further comprises a rotary developing unit 8A for color images, and a developing unit 8B for monochrome images that can be separated from the drum. The developing units supply toners as developers to electrostatic latent images formed on the photosensitive drum 2 by the exposure unit 4, thereby visualizing the latent images. The rotary developing unit 8A has a first developing section 8a for supplying yellow toner, a second developing section 8b for supplying cyan toner, and a third developing section 8c for supplying magenta toner. The image forming mechanism 1A further comprises an intermediate transfer belt 3 for temporarily holding a toner image formed on the photosensitive drum 2 by the developing unit 8A or 8B. The image forming mechanism 1A also comprises a cleaner 15 for cleaning the intermediate transfer belt 3, and a cleaning unit 6 for removing the toner remaining on the photosensitive drum 2.

The intermediate transfer belt 3 is stretched between the first to fourth rollers 3a to 3d with a predetermined tension. The portion of the intermediate transfer belt 3 that is stretched between the second and third rollers 3b and 3c is in contact with the periphery of the photosensitive drum 2. Further, a primary transfer roller 7 is in pressure contact with the upper portion of the photosensitive drum 2, with the intermediate transfer belt 3 interposed therebetween.

Respective pickup rollers 12 for picking paper sheets from the paper feed cassettes 25a to 25d are provided below the image forming mechanism 1A. Paper sheets picked by each pickup roller 12 are fed one by one by a paper feed roller 14a and separation roller 14b. A conveyance system 15 for conveying paper sheets to the intermediate transfer belt 3 is provided between the paper feed cassettes 25a to 25d and the intermediate transfer belt 3.

The conveyance system 15 comprises a conveyance roller 9, aligning roller 10, secondary transfer roller 11 arranged in this order in the paper conveyance direction. The aligning roller 10 temporarily stops each paper sheet fed thereto, thereby correcting the inclination of each paper sheet with respect to the conveyance direction. Further, the aligning roller aligns the leading edge of each paper sheet with the leading edge of a toner image on the intermediate transfer belt 3.

A fixing unit 13 for fixing a toner image, transferred to each paper sheet, on each sheet is provided downstream of the secondary transfer roller 11 with respect to the conveyance direction. The fixing unit 13 is formed of a heating roller 13a and pressing roller 13b. Ejection rollers 16 for ejecting each paper sheet onto the ejection tray cover 36 located below the ejection space 26 are provided downstream of the fixing unit 13 with respect to the conveyance direction.

A reversing unit 17 used for double-sided copying and a manual feeder 18 used for manually feeding paper sheets are provided at the other side of the main unit 1.

The image forming operation of the above-described image forming apparatus will now be described.

Image information of a document placed on the document table 19 is optically read by the optical reading unit 20. At this time, the surface of the photosensitive drum 2 is uniformly charged by the charger unit 5, and an electrostatic latent image corresponding to the image information is formed on the charged photosensitive drum 2 by the exposure unit 4. The latent image is sent to the developing unit 8B or 8A in accordance with the rotation of the photosensitive drum 2 and developed by black toner or color toners supplied thereto from the developing unit. The developed toner image is primarily transferred onto the intermediate belt 3 by the primary transfer roller 7 in accordance with the rotation of the photosensitive drum 2. After passing through the transfer region, the photosensitive drum 2 is optically deelectrified by a deelectrifier (not shown), and the toner remaining thereon is cleaned by the cleaner 6.

At this time, a paper sheet is fed from the paper feed cassette 25a (to 25d) into the clearance between the intermediate transfer belt 3 and secondary transfer roller 11. Onto this paper sheet, the toner image on the intermediate transfer belt 3 is secondarily transferred. After transfer, the paper sheet is separated from the intermediate transfer belt 3 and sent to the fixing unit 13, where the toner image is heated, pressed and fixed on the sheet. After fixing, the paper sheet is sent to the outside by the ejection rollers 16, and ejected onto the ejection tray cover 36 forming the bottom of the ejection space 26.

The ejection space 26 can receive a predetermined number of paper sheets in the height direction. It usually can receive one hundred or more ejected sheets.

Figure 4:
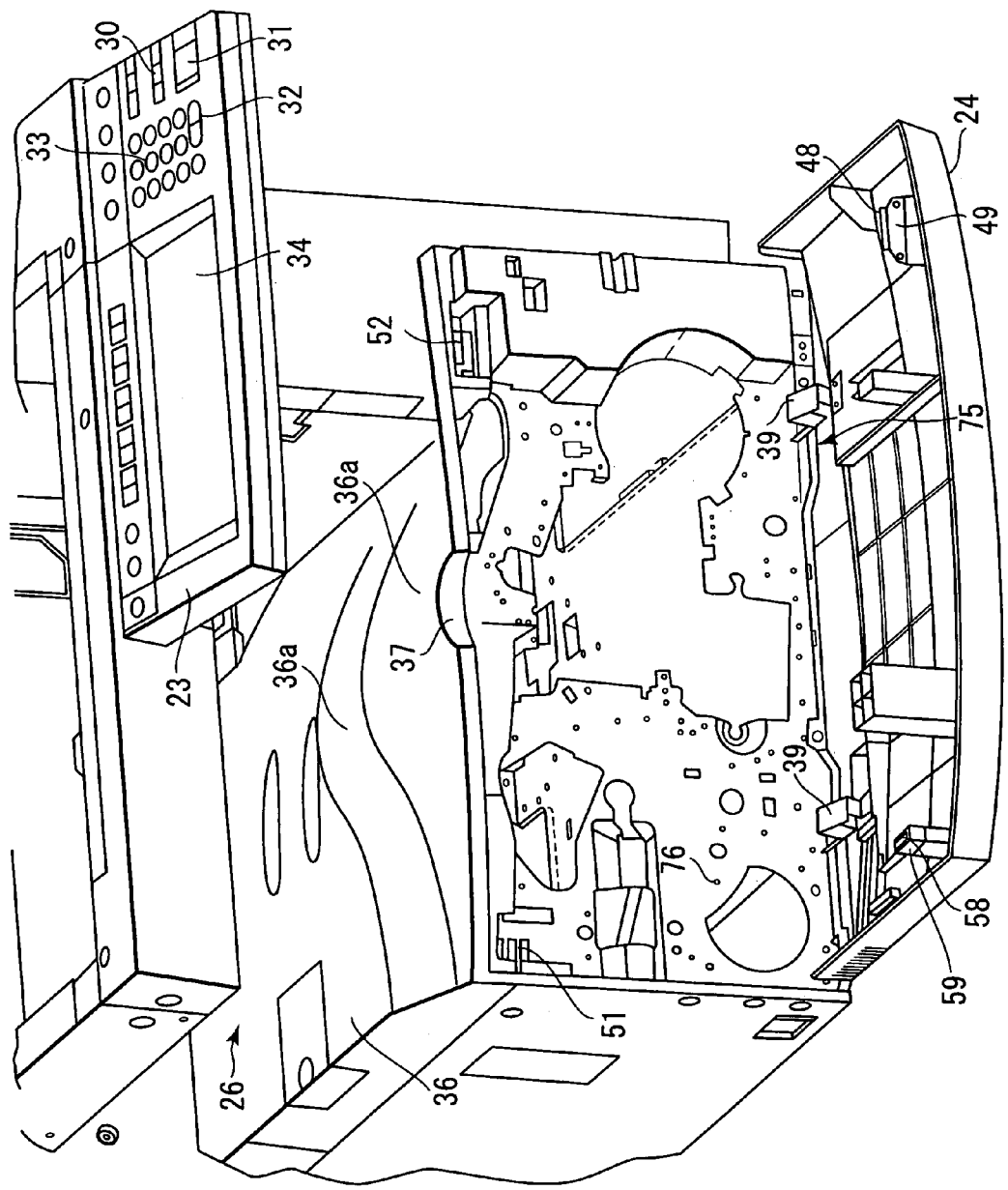
FIG. 4 is an expanded perspective view illustrating an ejection tray cover and control panel unit incorporated in the image forming apparatus.

FIG. 4 is an enlarged perspective view illustrating the above-described control panel unit 23, ejection tray cover 36 and front cover 24.

A stop key 30, master key 31 as an operation key, clear key 32 and ten key unit 33 are provided on one side portion of the upper surface of the control panel unit 23. A touch panel 34 that also serves as a display key is provided on the other side portion of the upper surface of the control panel unit 23.

The ejection tray cover 36 that receives paper sheets ejected from the ejection rollers 16 and covers the upper portion of the image forming section defines the bottom of the ejection space 26. The ejection tray cover 36 has an angled portion 36a downwardly inclining toward the front of the main unit 1, which enables paper sheets ejected on the ejection tray cover 36 to be easily held.

Figure 5:
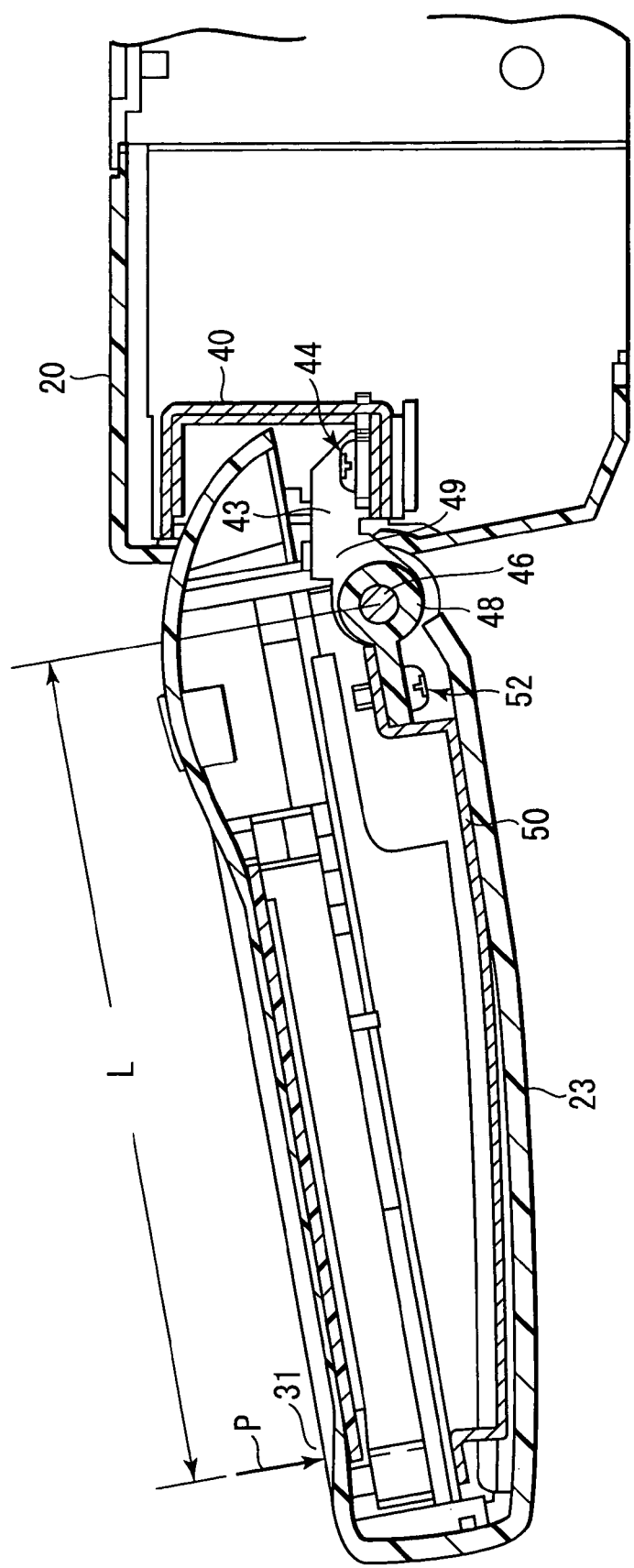
FIG. 5 is a sectional view illustrating an attachment structure of the control panel unit of the image forming apparatus.
Figure 6:
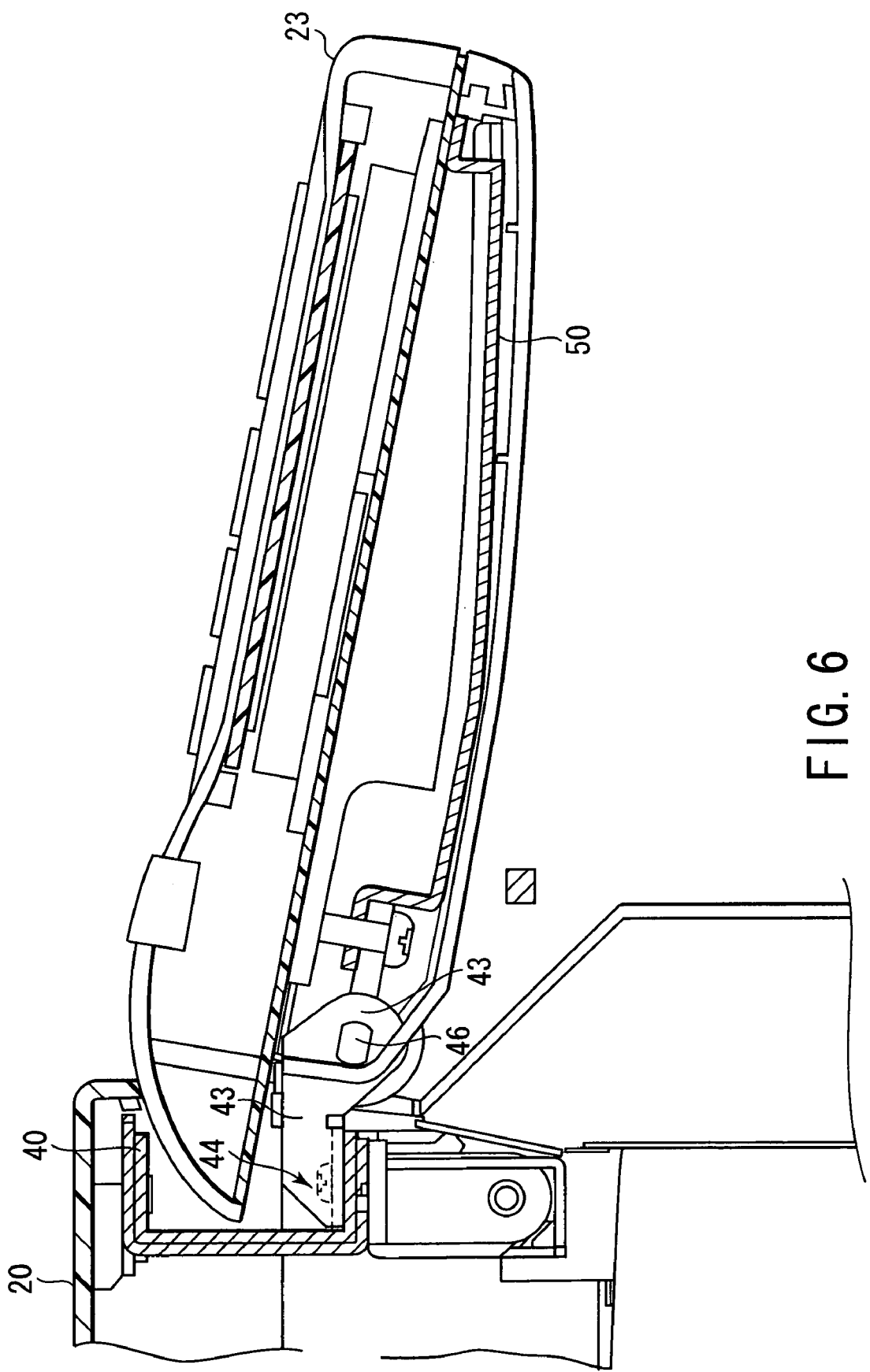
FIG. 6 is a sectional view illustrating another attachment structure of the control panel unit of the image forming apparatus.
Figure 7:
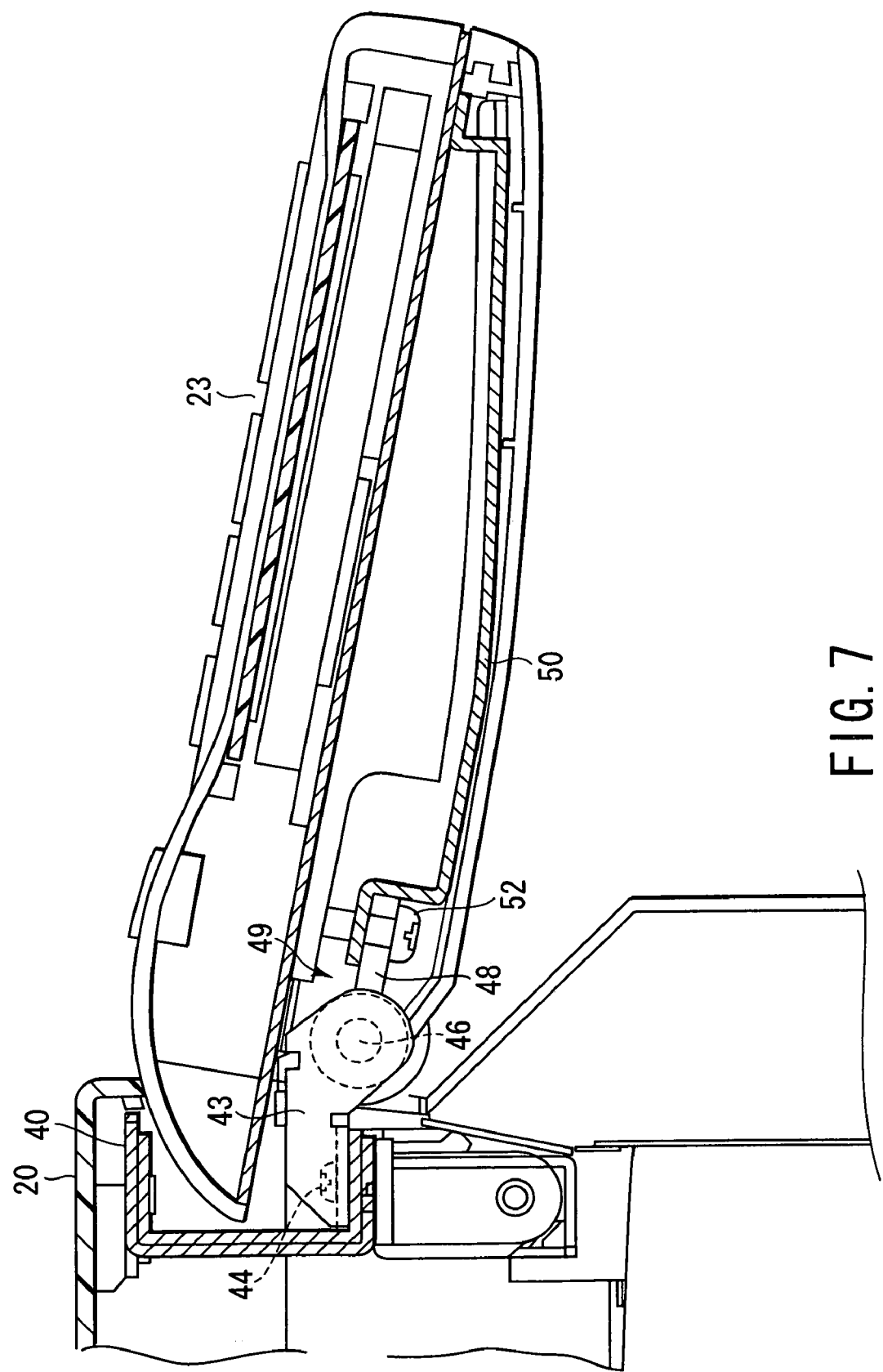
FIG. 7 is a sectional view illustrating yet another attachment structure of the control panel unit of the image forming apparatus.
Figure 8:
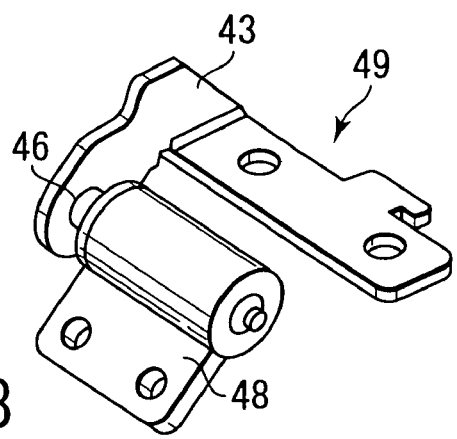
FIG. 8 is a perspective view illustrating a hinge used to attach the control panel unit.
Figure 9:
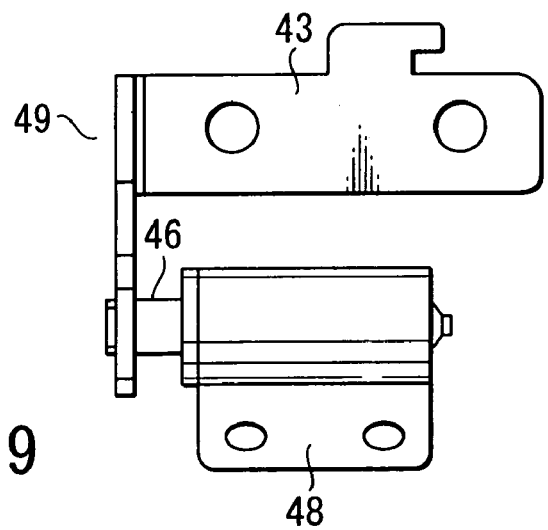
FIG. 9 is a plan view illustrating the hinge.
Figure 10:
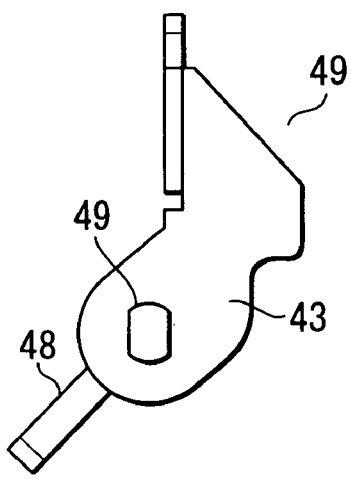
FIG. 10 is a side view illustrating the hinge.
Figure 11:
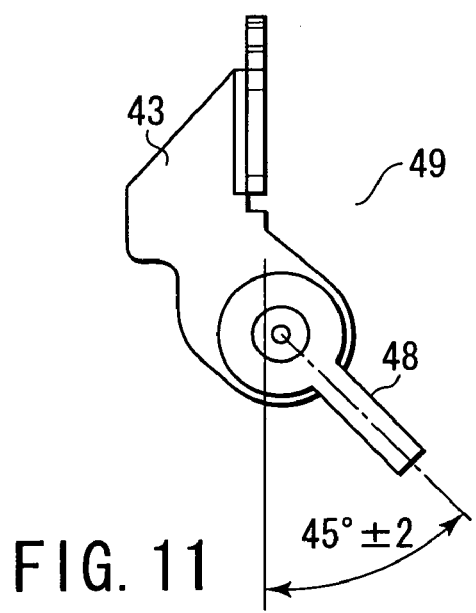
FIG. 11 is another side view illustrating the hinge.

FIGS. 5 to 7 are sectional views illustrating attachment structures of the control panel unit 23.

In the figures, reference numeral 40 denotes a stay as an attachment to be attached to the front frame 41 of the reading unit 20. An end of the hinge bracket 43 as shown in FIGS. 8 to 11 is secured to the stay 40 by a fixing screw 44. An end of a metal shaft 46 is caulked to the other end of the hinge bracket 43. The diameter of the portion of the metal shaft 46 to be fitted in a resin bracket 48 is larger by 0.05 mm to 0.3 mm than that of a fitting hole formed in the resin bracket 48. By press-fitting the metal shaft 46 into the fitting hole of the resin bracket 48, a rotational resistance (frictional resistance) is imparted from the resin bracket 48 to the metal shaft 46. The resin bracket 48 and hinge bracket 43 provide a hinge 49. The frame 50 of the control panel unit 23 is screwed, by a fixing screw 52, to the other end of the resin bracket 48 included in the hinge 49.

The thus-attached control panel unit 23 is pivotable through about 45 degrees with respect to a virtual horizontal plane. Specifically, the control panel unit 23 is vertically rotated about the shaft 46 against the frictional resistance of the resin bracket 48, and is kept in angular position after rotation by the frictional resistance.

The structure of the hinge 49 is not limited to the above one in which the shaft 46 is press-fitted in the bracket 48. It may have a structure in which a powder-utilizing torque limiter including iron powder and a magnet is contained, and the sum of the magnetic resistance and frictional resistance is imparted as a rotational resistance to the shaft 46.

Further, assuming that T represents the torque of the bracket 48, L the distance between the shaft 46 as the fulcrum of rotation of the control panel unit 23 and the key remotest from the shaft 46, e.g., the start key 31, and P the pressure used to operate the start key 31, the frictional resistance of the bracket 48 is set to satisfy $T > PL$. In other words, even if any key of the control panel unit 23 is pushed, the control panel unit 23 is prevented from downwardly rotation, and kept in position.

Figure 12:
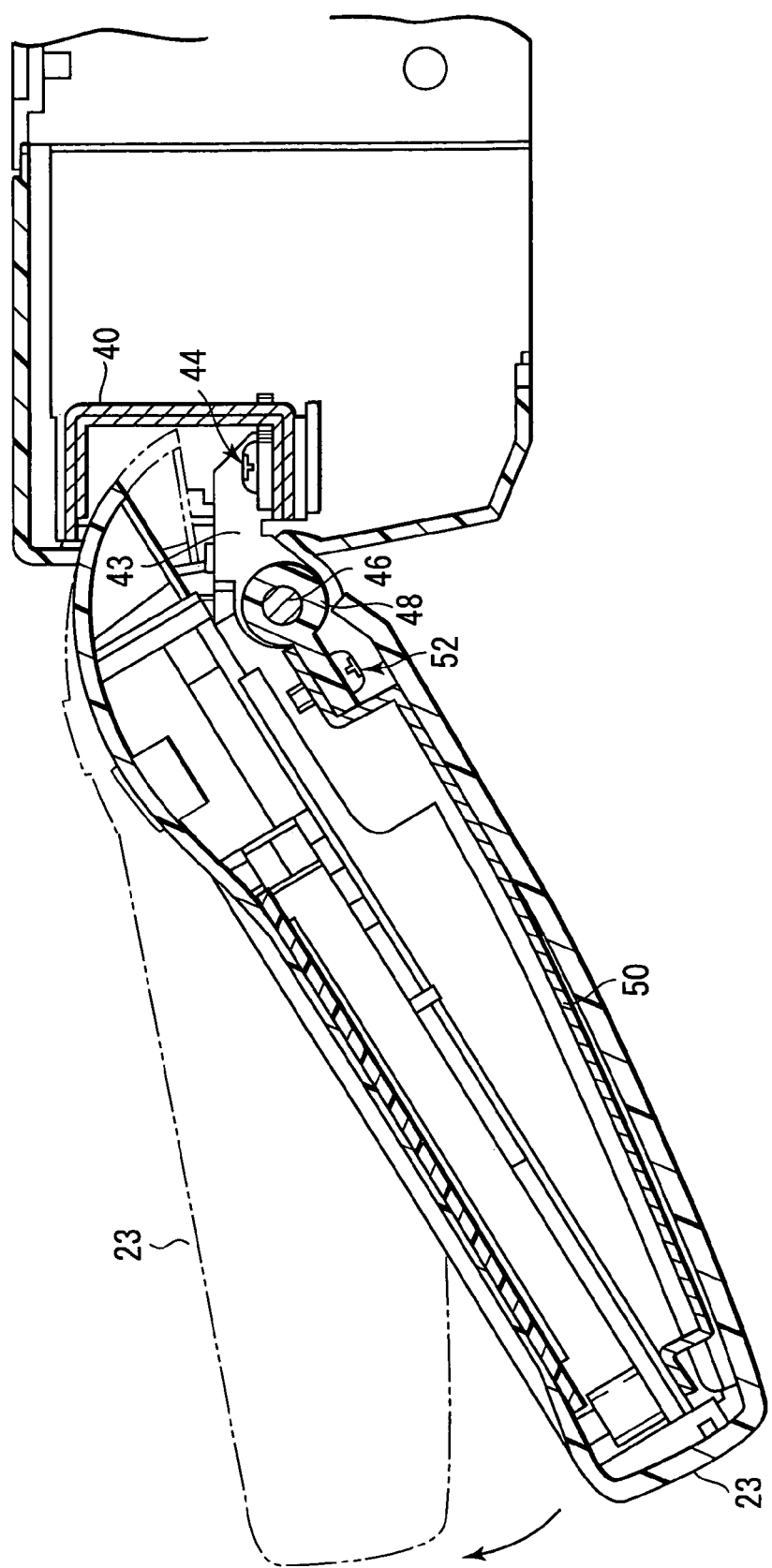
FIG. 12 is a view useful in explaining rotation of the control panel unit.

In use, the control panel unit 23 may be downwardly rotated through substantially 45 degrees below the virtual horizontal plane as shown in FIG. 12, thereby blocking the front of the ejection space 26.

In this case, if an operator tries to visually confirm, from the front, paper sheets ejected on the ejection tray cover 36 and placed in the lower portion of the ejection space 26 that has an opening at the front of the main unit 1, it is difficult for them to do so because of the blocking control panel unit 23.

Further, if the operator tries to take, from the front of the main unit 1, paper sheets ejected on the ejection tray cover 36, it is difficult for them to do so because of the blocking control panel unit 23.

In addition, when a conveyance unit for directly conveying paper sheets ejected from the ejection rollers 16 to an optional device is attached to or detached from the ejection space 26, time and effort is required because the control panel unit 23 interferes with the work.

Therefore, in that case, the operator raises the distal portion of the control panel unit 23 from the state indicated by the solid line in FIG. 12 to the substantially horizontal state indicated by the imaginary line, thereby displacing the control panel unit 23 from the front of the ejection space 26.

As a result, paper sheets ejected on the ejection tray cover 36 can be easily taken therefrom, and the conveyance unit can be easily attached and detached, without being interrupted by the control panel unit 23.

FIGS. 13 to 17 show a second embodiment of the invention.

In these figures, elements similar to those employed in the first embodiment are denoted by corresponding reference numerals, and no description is given thereof.

Figure 13:
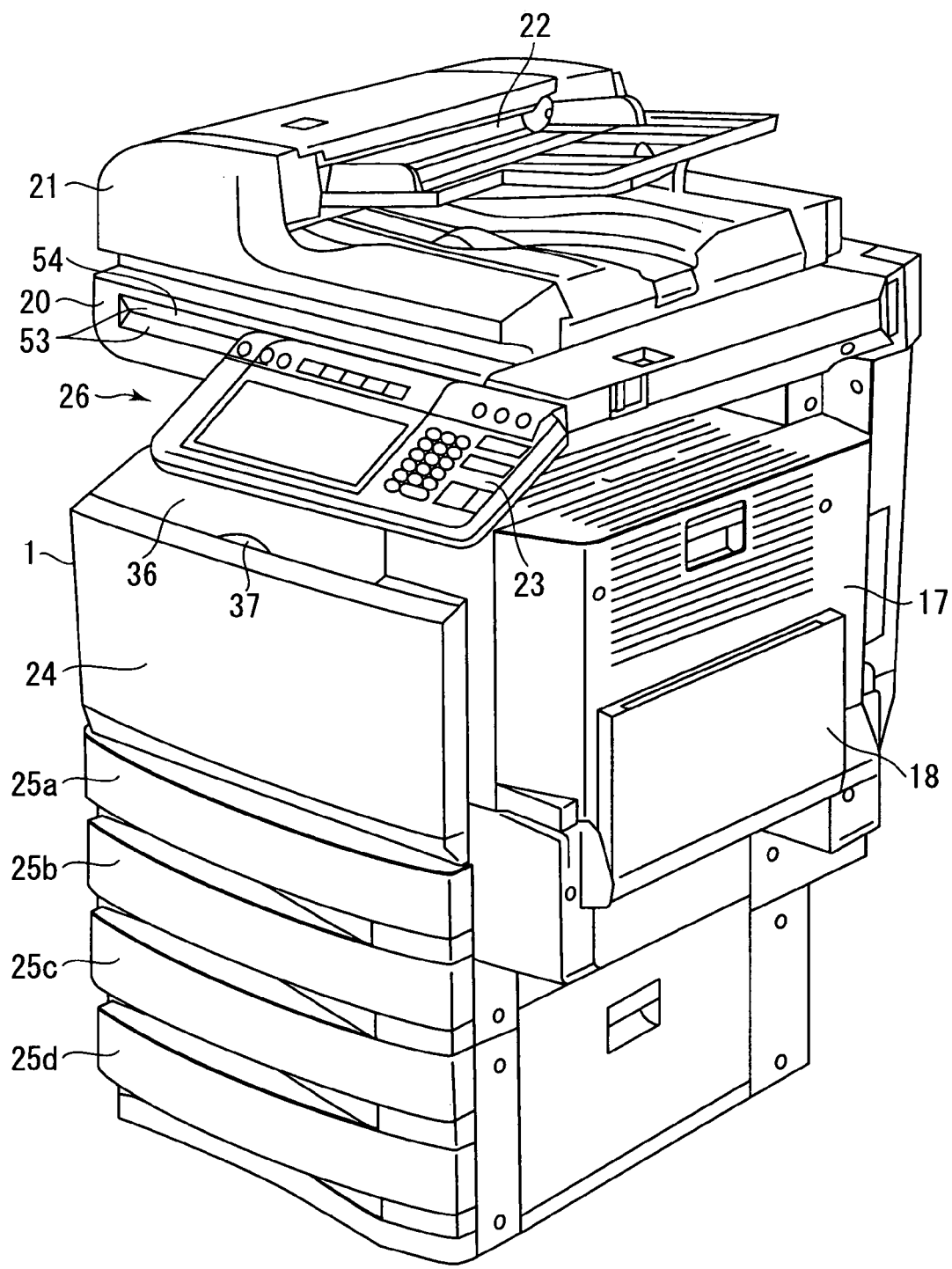
FIG. 13 is a perspective view illustrating another attachment example of the control panel unit.

FIG. 13 is a perspective view showing the outward appearance of the entire image forming apparatus.

A guide groove 54 is formed horizontally in the front portion of the reading unit 20 of the image forming apparatus, so that the control panel unit 23 is movable along the guide groove 54. A blind cover 53 is attached to the guide groove 54.

Figure 14:
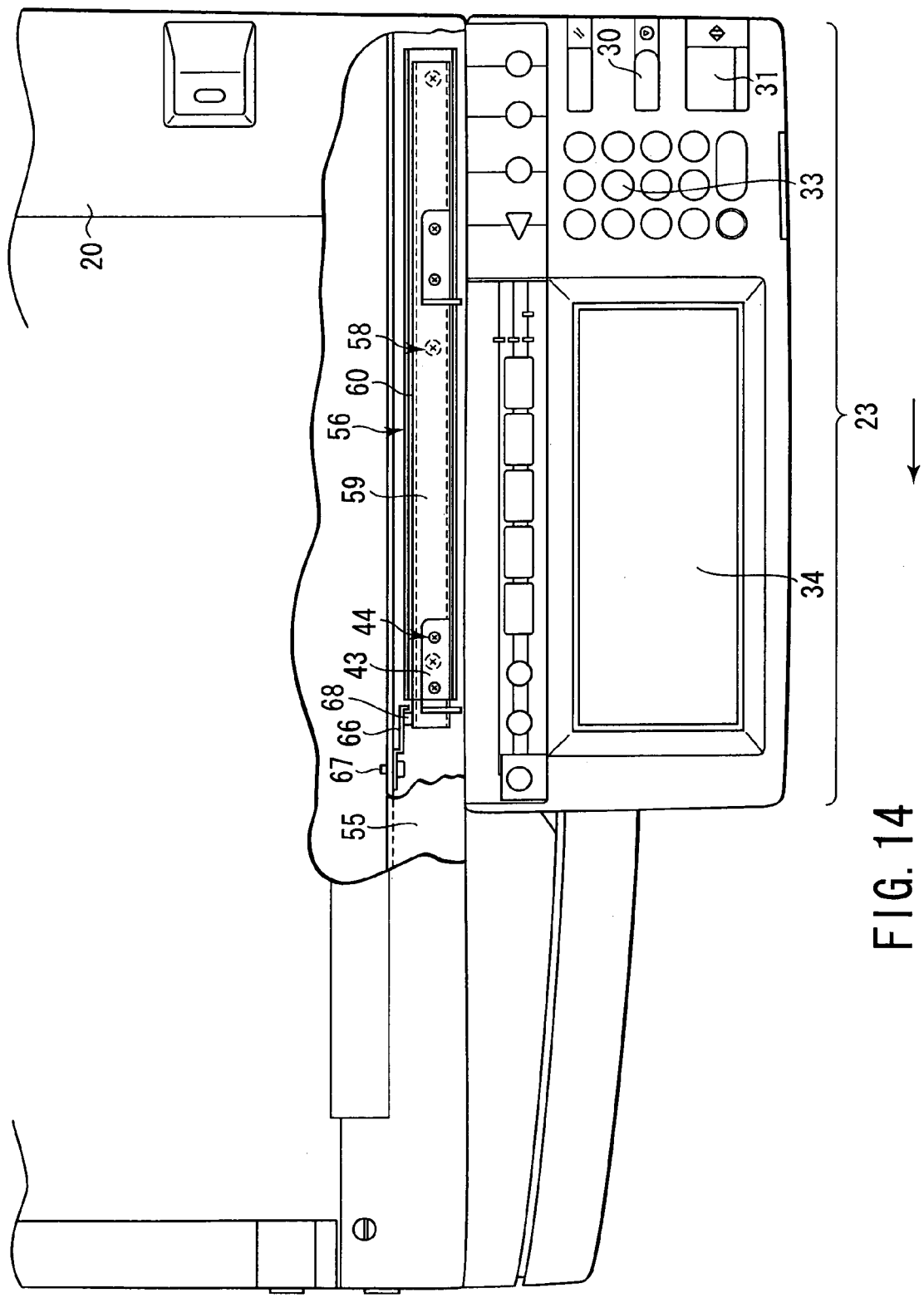
FIG. 14 is a plan view illustrating the attachment structure of the control panel unit of FIG. 13.
Figure 15:
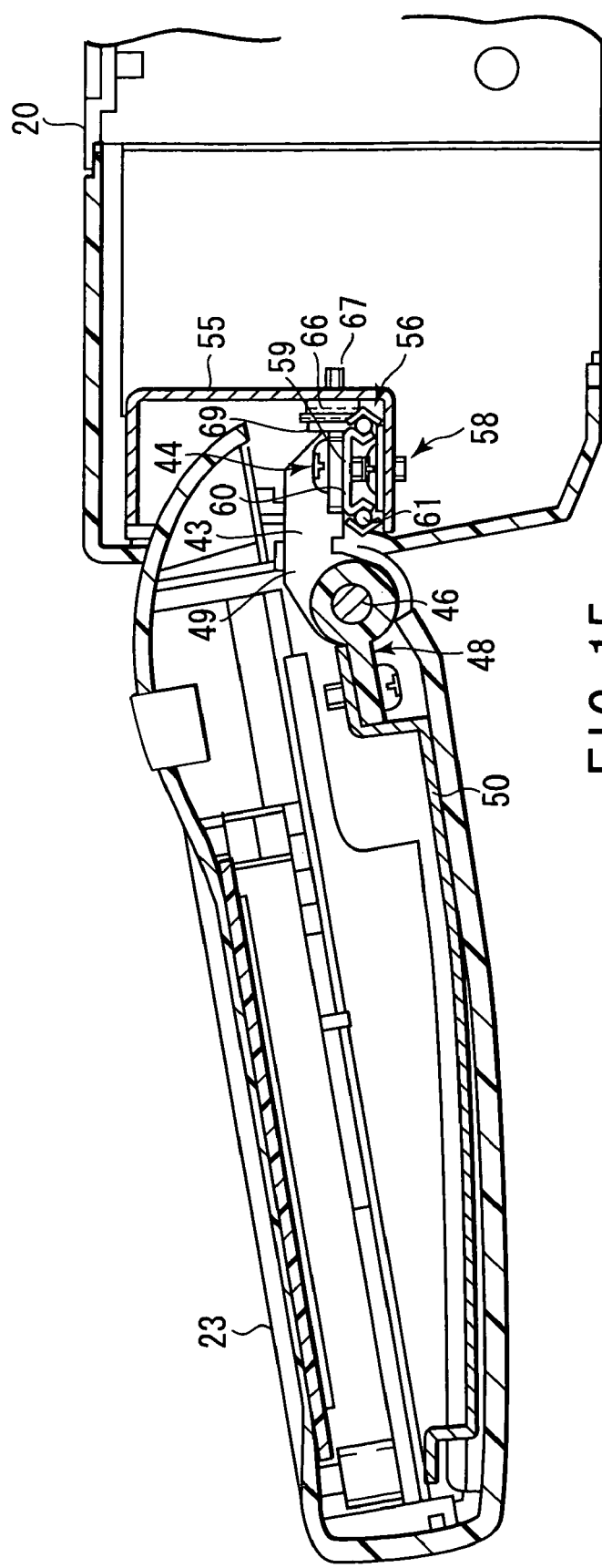
FIG. 15 is a sectional view illustrating the attachment structure of the control panel unit.

FIG. 14 is a plan view illustrating an attachment structure for the control panel unit 23, and FIG. 15 is a sectional view of the structure.

In the figures, reference numeral 55 denotes a stay as an attachment section provided in the reading unit 20, and the stay 55 has a guide rail 56 extending horizontally. A movable rail 59 is provided in the guide rail 56. The guide rail 56 and movable rail 59 provide a rail unit 60. A ball bearing 61 is interposed between the movable rail 59 and guide rail 56, so that the movable rail 59 can reciprocate along the guide rail 56. Of course, the movable rail 59 and guide rail 56 may be formed in a unit like the rail unit 60, or may not be formed in a unit.

An end of an elastic member 66 is secured to the stay 55 by a fixing screw 67, and the other end of the elastic member 66 is attached to a brake member 69. The brake member 69 is pressed against a side surface of the movable rail 56 to hold it.

The elastic member 66 is formed of a member having elasticity, such as a plate spring, wound spring, resin or rubber. Further, the brake member 69 may be formed of a resin or metal.

A brake member (not shown) may be interposed between the guide rail 56 and movable rail 59 to impart a movement resistance to the movable rail 59. Furthermore, a movement resistance may be imparted to the movable rail 59 by attaching a toothed rack (not shown) to the movable rail 59 and providing the stay 55 with a pinion (not shown), to be engaged with the toothed rack, and a torque limiter (not shown) for transmitting the force of the pinion.

One end of a hinge bracket 43 is secured to upper opposite ends of the movable rail 59 by fixing screws 44, and the control panel unit 23 is attached to the other end of the bracket 62 in the same manner as in the first embodiment.

Figure 16:
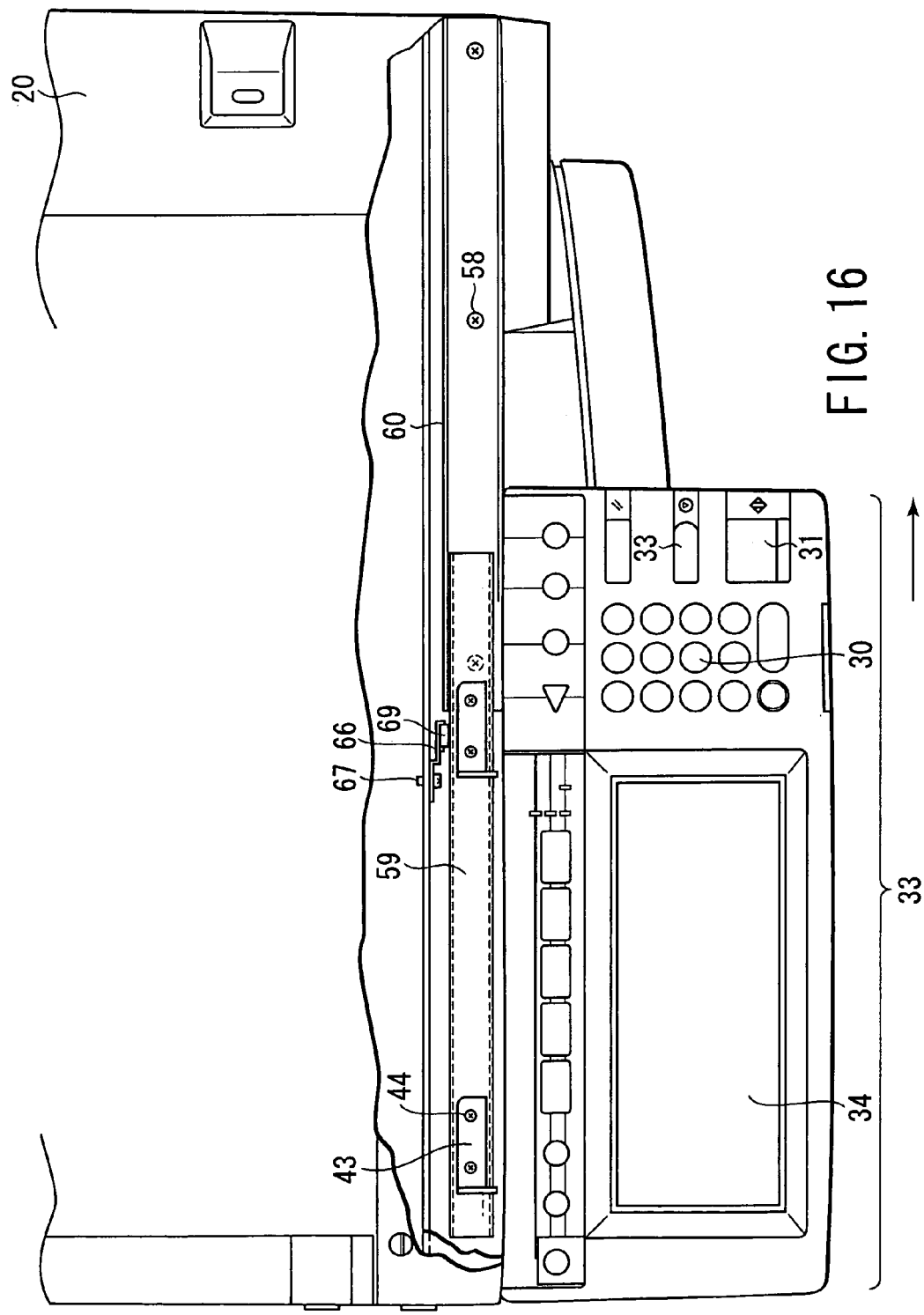
FIG. 16 is a plan view illustrating a state in which the control panel unit is moved.

In the second embodiment, the control panel unit 23 can be upwardly rotated and displaced from the front of the ejection space 26, when necessary, as in the first embodiment. Further, in the second embodiment, if a force of, for example, 1N or more is exerted onto the control panel unit 23 in the direction of movement, i.e., in the width direction of the main unit, the control panel unit 23 moves together with the movable rail 59, along the guide rail 56, from one end of the front surface of the reading unit 20, as shown in FIG. 14, to the other end of the front surface of the reading unit 20 as shown in FIG. 16.

Since a certain movement resistance is imparted to the movable rail 59, even if it is attempted to move the control panel unit 23 with a force less than a predetermined value (e.g. 1N), the control panel unit 23 does not move. Therefore, the second embodiment is advantageous in that paper sheets ejected on the ejection tray cover 36 can be visually confirmed more reliably, can be taken therefrom more easily, and the conveyance unit can be attached and detached more easily.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

The invention claimed is:

1. An image forming apparatus comprising:
a main unit having an image forming section configured to form an image on a sheet of paper;
an image reading section located just above the main unit, and configured to read a document image;
an ejection space defined between a bottom of the image reading section and the image forming section, the ejection space having an opening at a front of the main unit;
an ejection tray cover defining a bottom of the ejection space and configured to receive a paper sheet ejected from the image forming section, the ejection tray cover covering the image forming section;
an attachment section provided at a front of the image reading section;
a control panel unit attached to the attachment section by a hinge having a predetermined rotational resistance, the control panel unit being rotatable through a predetermined angle with respect to an imaginary horizontal plane, the control panel unit being able to be held in a direction of rotation;
a guide rail attached to the attachment section provided at the front of the image reading section; and
a movable rail movable along the guide rail, and
wherein the control panel unit is attached to the movable rail by the hinge having the predetermined rotational resistance, the control panel unit being rotatable through the predetermined angle with respect to the imaginary horizontal plane, the control panel unit being able to be held in the direction of rotation, the control panel unit being movable in a direction of a width of the main unit when a force not less than a predetermined value is exerted on the control panel unit.

2. The image forming apparatus according to claim 1, wherein the rotational resistance of the hinge can hold the control panel unit stationary in the direction of rotation even if an operational force is applied to the control panel unit.

3. The image forming apparatus according to claim 1, wherein the control panel unit moves in the direction of the width of the main unit if a force of 1 N or more is exerted thereon, and the control panel unit does not move if a force less than 1 N is exerted thereon.

4. An image forming apparatus comprising:
a main unit having an image forming section configured to form an image on a sheet of paper;
an image reading section including a base plate, located just above the main unit, and configured to read a document image;
an ejection space defined between a bottom of the image reading section and the image forming section, the ejection space having an opening at a front of the main unit;
an ejection tray cover defining a bottom of the ejection space and configured to receive a paper sheet ejected from the image forming section, the ejection tray cover covering the image forming section;
an attachment section provided at a front of the image reading section, and including a supporting plate secured with the base plate of the image reading section, a shaft fixed on the supporting plate, and a pivotable swing plate fitted with the shaft; and
a control panel unit attached to the pivotable swing plate of the attachment section, and mounted to enable the attachment section to have a predetermined rotational resistance, the control panel unit being rotatable through a predetermined angle with respect to an imaginary horizontal plane, and being able to be held in a direction of rotation.

5. The image forming apparatus according to claim 4, wherein the pivotable swing plate is formed of resin, and includes a fitting hole in which the shaft is fitted.

6. The image forming apparatus according to claim 5, wherein the shaft has a diameter which is greater than an inside diameter of the fitting hole of the pivotable swing plate.

7. The image forming apparatus according to claim 5, wherein the shaft has a diameter which is greater than an inside diameter of the fitting hole by 0.05 to 0.3 mm.

8. The image forming apparatus according to claim 5, wherein the shaft is press-fitted in the fitting hole of the pivotable swing shaft.

9. An image forming apparatus comprising:
a main unit having an image forming section configured to form an image on a sheet of paper;
an image reading section located just above the main unit, and configured to read a document image;
an ejection space defined between a bottom of the image reading section and the image forming section, the ejection space having an opening at a front of the main unit;
an ejection tray cover defining a bottom of the ejection space and configured to receive a paper sheet ejected from the image forming section, the ejection tray cover covering the image forming section;
an attachment section provided at a front of the image reading section; and
a control panel unit attached to the attachment section by a hinge including a powder-utilizing torque limiter.

10. The image forming apparatus according to claim 9, wherein the power-utilizing torque limiter includes iron powder.

* * * * *